US008749541B2

(12) United States Patent
Kim

(10) Patent No.: US 8,749,541 B2
(45) Date of Patent: Jun. 10, 2014

(54) DECREASING POWER CONSUMPTION IN DISPLAY DEVICES

(75) Inventor: Taesung Kim, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 124 days.

(21) Appl. No.: 13/440,644

(22) Filed: Apr. 5, 2012

(65) Prior Publication Data

US 2013/0265294 A1 Oct. 10, 2013

(51) Int. Cl.

| | |
|---|---|
| ***G06F 3/038*** | (2013.01) |
| ***G09G 3/36*** | (2006.01) |
| ***G09G 5/10*** | (2006.01) |

(52) U.S. Cl.

USPC .............. 345/212; 345/89; 345/211; 345/690

(58) Field of Classification Search

USPC ..................... 345/204, 211, 55, 690, 698, 89; 348/699

See application file for complete search history.

(56) References Cited

U.S. PATENT DOCUMENTS

| | | | | |
|---|---|---|---|---|
| 7,017,053 B2 | | 3/2006 | Mizuyabu et al. | |
| 7,119,803 B2 | * | 10/2006 | Stanley et al. | 345/211 |
| 7,123,246 B2 | | 10/2006 | Nakatani et al. | |
| 7,532,195 B2 | | 5/2009 | Sasmpsell | |
| 2001/0028409 A1 | * | 10/2001 | Watanabe et al. | 348/554 |
| 2008/0100598 A1 | * | 5/2008 | Juenger | 345/204 |
| 2009/0219295 A1 | * | 9/2009 | Reijnaerts | 345/501 |
| 2009/0251445 A1 | * | 10/2009 | Ito et al. | 345/204 |
| 2011/0063333 A1 | * | 3/2011 | Chiou et al. | 345/690 |

* cited by examiner

*Primary Examiner* — Lun-yi Lao
*Assistant Examiner* — Jarurat Suteerawongsa
(74) *Attorney, Agent, or Firm* — Fletcher Yoder PC

(57) ABSTRACT

Techniques for reducing the power consumption of display devices are provided. In one embodiment, a display device includes a timing controller that may control a rate at which frames are refreshed on a display. The timing controller may cause the frames to refresh at different rates, depending on the image data received at the timing controller. For example, if the image data is not static, the frames may be refreshed at a first rate. However, if the image data is static, the frames may be refreshed at a lower, second rate to reduce the power consumption of the display device.

31 Claims, 8 Drawing Sheets

DECREASING POWER CONSUMPTION IN DISPLAY DEVICES

BACKGROUND

The present disclosure relates generally to display devices, and more particularly, to techniques for decreasing the power consumption of display devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Liquid crystal displays (LCDs) are commonly used as screens or displays for a wide variety of electronic devices, including such consumer electronics as televisions, computers, and handheld devices (e.g., cellular telephones, audio and video players, gaming systems, and so forth). Such LCD devices typically provide a flat display in a relatively thin package that is suitable for use in a variety of electronic goods. In addition, such LCD devices typically use less power than comparable display technologies, making them suitable for use in battery powered devices or in other contexts were it is desirable to minimize power usage.

However, display devices, such as LCD devices, still consume much power. Moreover, portable display devices such as laptop computers may be powered by a battery supplying a limited amount of power before it can be recharged. Due to the power consumption of display devices and limitations in power supply, technologies for decreasing power consumption to display devices may be advantageous.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a display device includes a timing controller configured to control a rate at which frames are refreshed on a display. For example, the timing controller may cause the frames to refresh at different rates, depending on the image data received at the timing controller. In one mode, frames on the display device are refreshed at a first rate. In another mode, frames on the display device are refreshed at a lower, second rate. Further, a pixel formatter may format image data in different modes depending on the image data received by the timing controller.

In a second embodiment, a method of displaying image data on a display includes determining whether a current frame is substantially identical to the next frame. If the current frame is substantially identical to the next frame, the frames are refreshed at a first refresh rate. However, if the current frame is not substantially identical to the next frame, the frames are refreshed at a higher, second rate.

In a third embodiment, a system includes pixel drivers and a timing controller. The pixel drivers are configured to drive pixels to display consecutive frames representing image data, and the timing controller is configured to refresh frames on a display at different rates.

In a fourth embodiment, a method of displaying image data on a display includes refreshing frames on the display at different rates. When certain frames are refreshed at a lower rate, other frames may be maintained.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
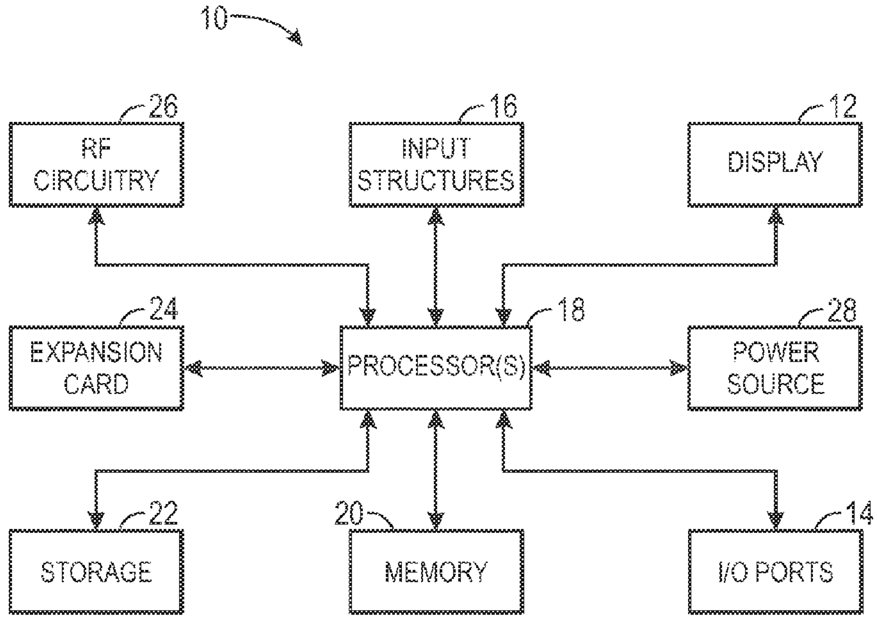
FIG. 1 is a block diagram illustrating components that may be present in an electronic device in accordance with aspects of the present disclosure.

As may be appreciated, electronic devices may include various internal and/or external components which contribute to the function of the device. For instance, FIG. 1 is a block diagram illustrating components that may be present in one such electronic device 10. Those of ordinary skill in the art will appreciate that the various functional blocks shown in FIG. 1 may include hardware elements (including circuitry), software elements (including computer code stored on a computer-readable medium, such as a hard drive or system memory), or a combination of both hardware and software elements. FIG. 1 is only one example of a particular implementation and is merely intended to illustrate the types of components that may be present in the electronic device 10. For example, in the presently illustrated embodiment, these components may include a display 12, input/output (I/O) ports 14, input structures 16, one or more processors 18, one or more memory devices 20, non-volatile storage 22, expansion card(s) 24, networking device 26, and power source 28. The display 12 may be used to display various images generated by the electronic device 10. The display 12 may be any suitable display, such as a liquid crystal display (LCD), an organic light-emitting diode (OLED) display, or an oxide thin-film (oxide TFT) transistor display. Additionally, in certain embodiments of the electronic device 10, the display 12 may be provided in conjunction with a touch-sensitive element, such as a touch-screen, that may be used as part of the control interface for the device 10. The display 12 may also include circuitry to enable modulation between a default mode and a low power mode to decrease power consumption.

Figure 2:
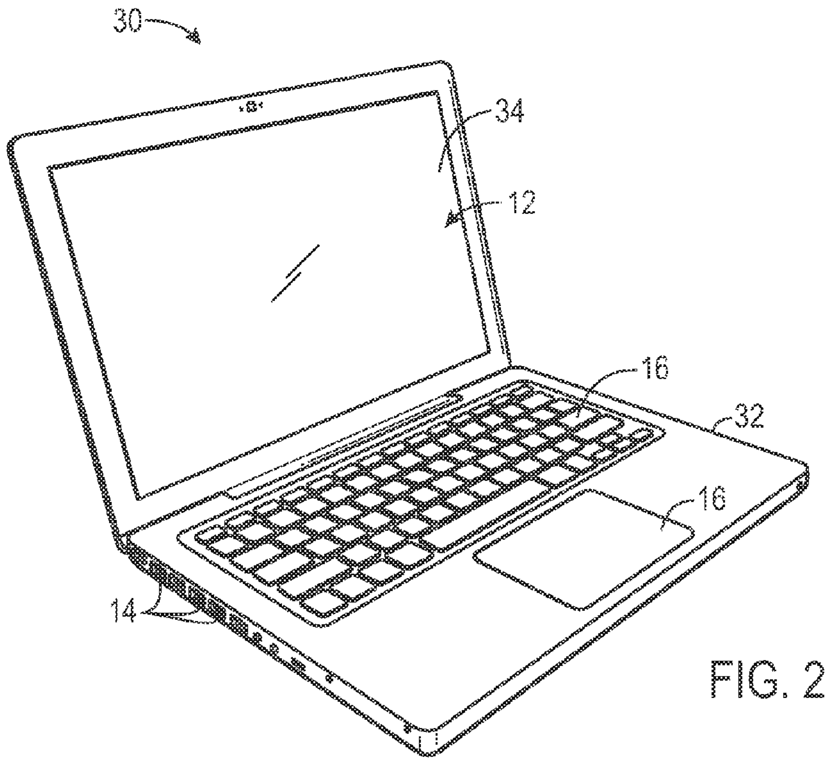
FIG. 2 is a perspective view of a computer in accordance with aspects of the present disclosure.

The electronic device 10 may take the form of a computer system or some other type of electronic device. Such computers may include computers that are generally portable (such as laptop, notebook, tablet, and handheld computers), as well as computers that are generally used in one place (such as conventional desktop computers, workstations and/or servers). In certain embodiments, electronic device 10 in the form of a computer may include a model of a MacBook®, MacBook® Pro, MacBook Air®, iMac®, Mac® mini, or Mac Pro® available from Apple Inc. of Cupertino, Calif. By way of example, an electronic device 10 in the form of a laptop computer 30 is illustrated in FIG. 2 in accordance with one embodiment. The depicted computer 30 includes a housing 32, a display 12 (e.g., in the form of an LCD 34 or some other suitable display), I/O ports 14, and input structures 16.

The display 12 may be integrated with the computer 30 (e.g., such as the display of the depicted laptop computer) or may be a standalone display that interfaces with the computer 30 using one of the I/O ports 14, such as via a DisplayPort, Digital Visual Interface (DVI), High-Definition Multimedia Interface (HDMI), or analog (D-sub) interface. For instance, in certain embodiments, such a standalone display 12 may be a model of an Apple Cinema Display®, available from Apple Inc.

Figure 3:
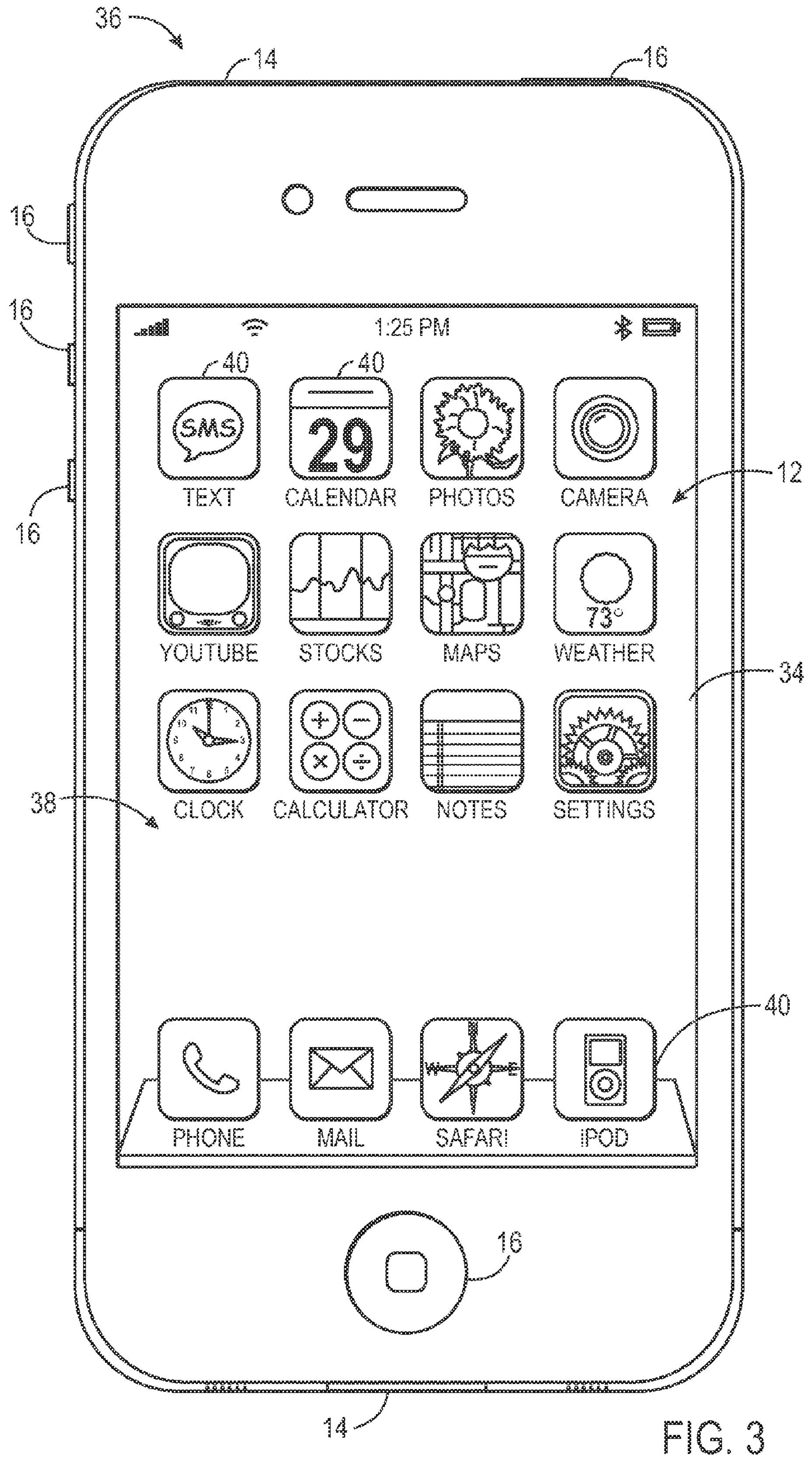
FIG. 3 is a perspective view of a handheld electronic device in accordance with aspects of the present disclosure.

Although an electronic device 10 is generally depicted in the context of a computer in FIG. 2, an electronic device 10 may also take the form of other types of electronic devices. In some embodiments, various electronic devices 10 may include mobile telephones, media players, personal data organizers, handheld game platforms, cameras, and combinations of such devices. For instance, as generally depicted in FIG. 3, the device 10 may be provided in the form of handheld electronic device 36 that includes various functionalities (such as the ability to take pictures, make telephone calls, access the Internet, communicate via email, record audio and video, listen to music, play games, and connect to wireless networks). By way of further example, handheld device 36 may be a model of an iPod®, iPod® Touch, or iPhone® available from Apple Inc. In the depicted embodiment, the handheld device 32 includes the display 12, which may be in the form of an LCD 34. The LCD 34 may display various images generated by the handheld device 32, such as a graphical user interface (GUI) 38 having one or more icons 40. A user may perform various functions using touch-screen technology by touching a top surface of a touch-sensitive LCD 34 and accessing the GUI 38.

In another embodiment, the electronic device 10 may also be provided in the form of a portable multi-function tablet computing device (not illustrated). In certain embodiments, the tablet computing device may provide the functionality of two or more of a media player, a web browser, a cellular phone, a gaming platform, a personal data organizer, and so forth. By way of example only, the tablet computing device may be a model of an iPad® tablet computer, available from Apple Inc.

With the foregoing discussion in mind, it may be appreciated that an electronic device 10 in either the form of a computer 30 (FIG. 2) or a handheld device 36 (FIG. 3) may be provided with a display device 12 in the form of an LCD 34. As discussed above, an LCD 34 may be utilized for displaying respective operating system and/or application graphical user interfaces running on the electronic device 10 and/or for displaying various data files, including textual, image, video data, or any other type of visual output data that may be associated with the operation of the electronic device 10.

Figure 4:
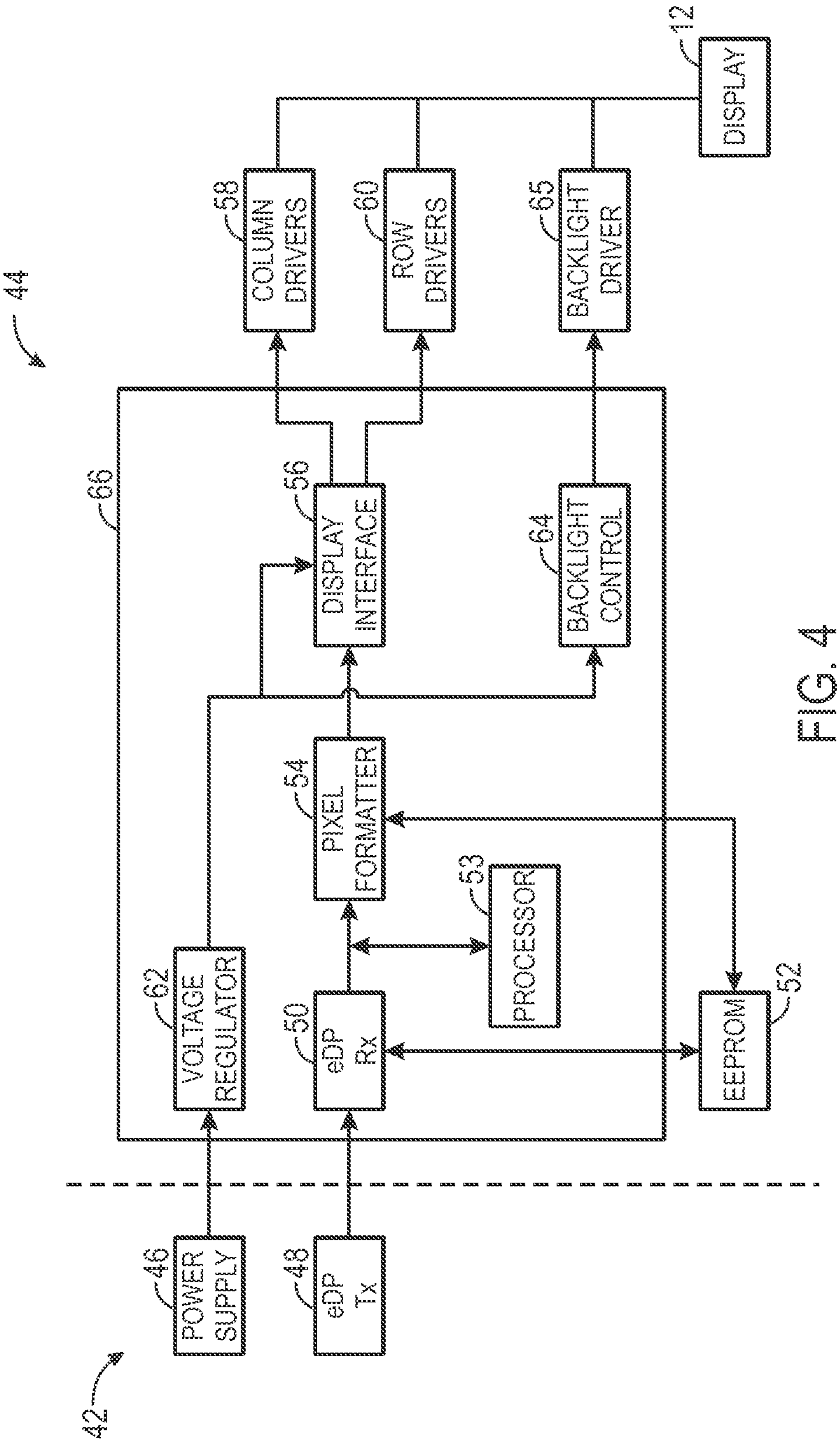
FIG. 4 is a block diagram illustrating elements of an electronic device that enable a display device to display images in accordance with aspects of the present disclosure.

FIG. 4 is a block diagram illustrating a portion of an electronic device 10 configured to display images at display 12. The portion of electronic device 10 may be grouped into a graphics processing unit (GPU) side 42 and a display side 44. GPU side 42 includes elements designed to transmit image data and provide power to image control elements on display side 44. Display side 44 includes elements to receive and format the image data from GPU side 42 and to continuously display image frames displayed by display 12. In certain embodiments, display 12 may include circuitry on GPU side 42 and/or on display side 44 that is configured to decrease the power consumption of display 12.

As illustrated, GPU 42 includes a power supply 46 and an image transmitter 48. Power supply 46 provides power to downstream elements on display side 44. Image transmitter 48 is configured to deliver image data to an image receiver 50 on display side 44. By way of example, image transmitter 48 may include an embedded DisplayPort™ (eDP) source or any other digital display interface suitable for transmitting image data from GPU side 42 to display side 44. Similarly, image receiver 50 may include an eDP receiver or any other digital display interface configured to receive image data from GPU side 42.

From image receiver 50, the image data may be directed to an EEPROM 52, a processor 53, and/or a pixel formatter 54. Processor 53 may perform algorithms or routines on the image data to reduce the power consumption of device 10. EEPROM 52 may be any form of non-volatile memory, such as a flash drive. In addition, EEPROM 52 may send image data to, and/or receive image data from pixel formatter 54. Pixel formatter 54 formats the image data and transmits the formatted image data through display interface 56 to drive column drivers 58 and row drivers 60. Display interface 56 may receive image data from pixel formatter 54 and transmit the image data to column drivers 58 and row drivers 60. The column drivers 58 and row drivers 60 may be controlled to drive pixels in a display 12 at certain voltages and frequencies to display images on the display screen. In other words, column drivers 58 and row drivers 60 may receive formatted image data from display interface 56 and adjust certain pixels on the display screen.

Power supply 46 connects to a voltage regulator 62 to power elements on display side 44. For example, voltage regulator 62 powers display interface 56 and a backlight control 64. Backlight control 64 controls backlight driver 65, which drives the backlight of the display to illuminate pixels to form the image in display 12. As may be appreciated, different images may be illuminated with varying intensities of light. Backlight control 64 and backlight driver 65 are mechanisms to regulate the light intensity of the pixels in display 12. For example, a backlight may be used to increase readability in low light conditions.

As shown, timing controller 66 (TCON) is an element of display side 44 and may include voltage regulator 62, eDP receiver 50, processor 53, pixel formatter 54, display interface 56, and backlight controller 64. TCON 66 may generally control the rate at which frames are displayed (refreshed) on display 12. For example, frames may be displayed at a rate of 60 Hz. According to certain embodiments, display 12 may include circuitry that enables TCON 66 and/or GPU 42 to reduce the power consumption of device 10. In some instances, a current frame may be identical to the previous frame (e.g. a static image). Certain embodiments of display 12 may include circuitry to minimize the power consumption of device 10 when a static image has been detected.

Figure 5:
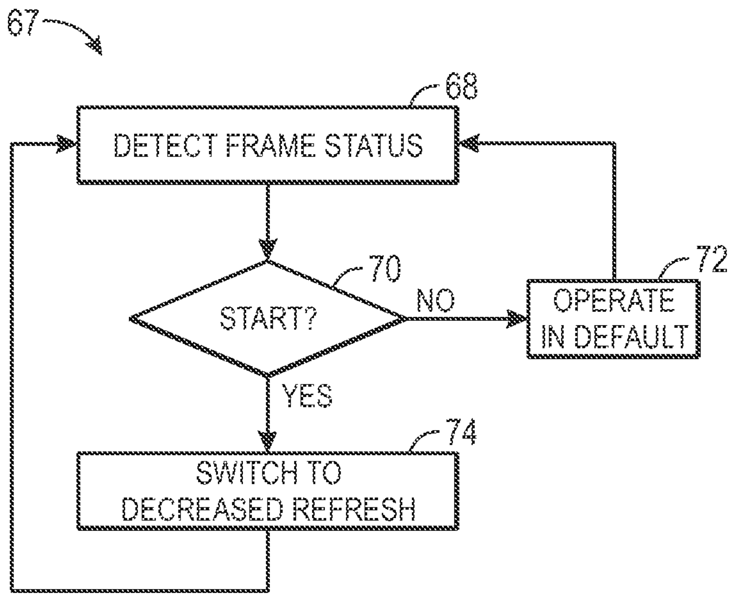
FIG. 5 is a flow chart of a process for controlling frame refresh based on frame status in accordance with aspects of the present disclosure.

FIG. 5 is a flow chart of a process 67 for reducing the power consumption of device 10 by controlling a refresh rate of a display 12. As discussed previously, TCON 66 may control the rate (refresh rate) at which consecutively identical or substantially identical frames (i.e., static images) are displayed on display 12. In certain embodiments, the pixel formatter 54 of TCON 66 may control the refresh rate of display 12 according to the process 67 as set forth below. In other embodiments, processor 53 may control the refresh rate of display 12. In yet other embodiments, a different element of TCON 66 or a combination of elements of TCON 66 may control the refresh rate. As may be appreciated, the refresh rate of display 12 may be 30 Hz, 60 Hz, 120 Hz, or another suitable number. For example, if the refresh rate is 60 Hz, the frame displayed on display 12 is changed 60 times per second. Similarly, if the refresh rate is 30 Hz, the frame displayed on display 12 is changed 30 times per second.

Sometimes, the frame currently displayed on display 12 is substantially identical to the frame previously displayed (e.g. a static image). In the case of a static image, it may be possible to reduce the refresh rate without creating visible disruptions on display 12. As may be appreciated, a lower refresh rate generally requires less power consumption than a higher refresh rate. For example, displaying images at a refresh rate of 30 Hz may reduce power consumption as compared to displaying images at a refresh rate of 60 Hz. In some embodiments, a lower refresh rate may be any rate lower than a default refresh that is high enough such that visible disruptions do not appear on display 12. Certain embodiments of display 12 may include circuitry (such as TCON 66) to detect whether frames are substantially identical, also referred to as similar, to reduce the refresh rate when similar frames have been detected, thereby decreasing the power consumption of display 12.

As illustrated by process 67, TCON 66 may detect (block 68) the status of the frame changes using, for example, a checksum or hash function comparison. A checksum or hash is an algorithm or routine to map a large data set, such as an image frame, into a smaller data set. For example, an image frame may use 2,000,000 bytes of memory, while its corresponding checksum or hash may use 16 bytes of memory. As may be appreciated, detecting the status of frame changes using a checksum or a hash function comparison may be relatively efficient. By way of example, a checksum algorithm could be a longitudinal parity check or another suitable algorithm. If the checksums of two consecutive frames are equal, then the frames are likely similar. Similarly, if the checksums of two consecutive frames are different, then the frames are likely different. In other embodiments, TCON 66 may detect (block 68) the status of frame changes using a different method, such as a pixel-by-pixel comparison.

If TCON 66 determines (block 70) that the frames are not substantially identical, then TCON 66 may operate (block 72) in the default mode. When the TCON 66 operates in the default mode, display 12 may be refreshed at a default refresh rate (e.g., 60 Hz). In other embodiments, the default refresh rate may be 30 Hz, 120 Hz, 240 Hz, or another suitable number. Otherwise, if TCON 66 determines (block 70) that the frames are substantially identical, then TCON 66 may switch (block 74) to decreased refresh mode, where the display 12 may be refreshed at a refresh rate less than its default refresh rate (e.g., 30 Hz) to reduce the power consumption of device 10. As discussed previously, refreshing the frames at a lower rate may reduce the power consumption of device 10.

After TCON 66 either operates (block 72) in the default mode or switches (block 74) to decreased refresh mode, TCON 66 may continue to detect (block 68) the status of incoming frames and perform the process 67. As shown, process 67 may be performed by display side 44. However, in other embodiments, process 67 may be performed partially or entirely by GPU side 42. For example, GPU side 42 may detect (block 68) the status of frame changes and detect (block 70) if the frames are similar before transmitting image data to display side 44. Display side 44 may then operate (block 72) in default mode or switch (block 74) to decreased refresh mode.

In some embodiments, process 67 may be performed on a single frame considered as a whole, where the TCON 66 may control different refresh rates based on the entire frame area. As may be appreciated, certain frames may include smaller frame regions that are substantially identical among frames, even if the frame would not be considered similar if considered as a whole. Thus, in certain embodiments, the frame may be subdivided into smaller frame regions. For instance, each of the smaller frame regions in a display area may operate in default mode or in decreased refresh mode independently of the other regions. A controller may implement the process 67, as described previously, for each smaller frame region. For example, display 12 may identify smaller static regions within an otherwise non-static display image (e.g. a static menu bar on an otherwise non-static video player). Similarly, display 12 may identify smaller non-static regions within an otherwise static frame (e.g. a non-static clock feature on an otherwise static desktop). Thus, display 12 may operate simultaneously in default mode and in decreased refresh mode, depending on the frame status of each smaller frame region. In such an embodiment, operating certain smaller frame regions in decreased refresh mode may reduce the power consumption of display 12.

Figure 6A:
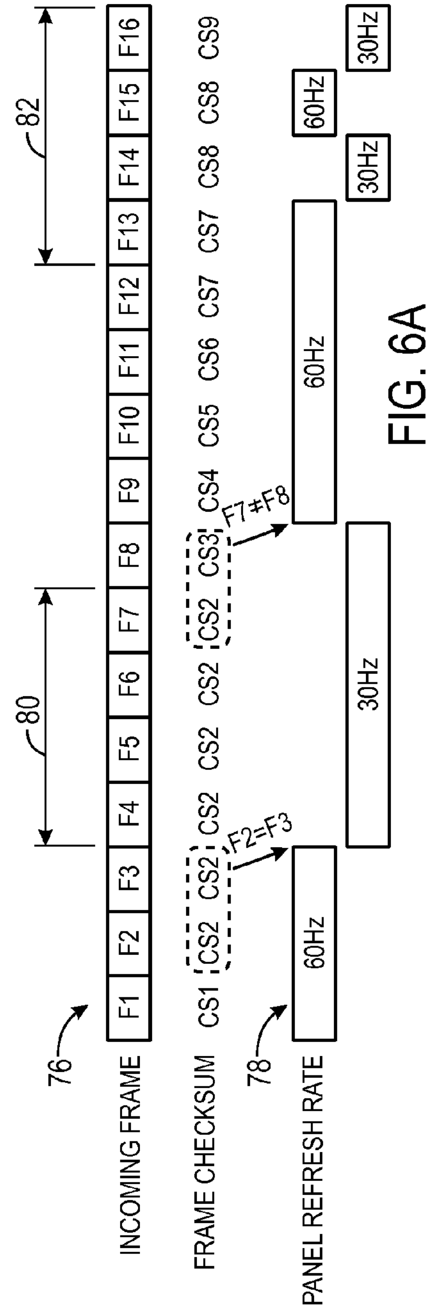
FIGS. 6A and 6B are timing diagrams representing the relationship between incoming frames on an electronic device as illustrated in FIG. 4 and the refresh rate of the display device in accordance with aspects of the present disclosure.

FIG. 6A is a timing diagram representing the relationship between a series of incoming frames 76 and the refresh rate 78 in one embodiment of display 12 configured to reduce the power consumption of device 10. As shown, the default mode includes operating display 12 with a refresh rate of 60 Hz. Thus, the default refresh rate of display 12 is 60 Hz. In other embodiments, display 12 could have a default refresh rate other than 60 Hz, such as 72 Hz or 120 Hz. Further, as illustrated, the decreased refresh mode includes operating display 12 with a lower refresh rate of 30 Hz. As may be appreciated, the refresh rate of the decreased refresh mode may vary and may be any refresh rate less than the default refresh rate, such that no visible disruptions occur on the display 12. For example, the refresh rate of the decreased refresh mode may be 40 Hz or 20 Hz.

As discussed above, a controller, such as TCON 66, detects (block 68) of frame changes of incoming frames 76. TCON 66 may receive incoming frames 76 from image transmitter 48. In addition, TCON 66 may calculate a frame checksum for each frame of the incoming frames 76. As illustrated by FIG. 6A, frame F1 has a calculated checksum of CS1, frame F2 has a calculated checksum of CS2, and so on. The controller may then determine (block 70) if incoming frames 76 are substantially identical by comparing the calculated checksums of incoming frames 76. Generally, a frame is determined (block 70) to be similar if its checksum is equal to the checksum of the preceding frame. For example, frame F3 is similar because its checksum CS2 is equal to the checksum CS2 of preceding frame F2. Frame F8 is not similar because its checksum CS3 is not equal to the checksum CS2 of preceding frame F7.

In other embodiments, the definition of a similar frame may vary. For example, a frame may be determined (block 70) to be similar if its checksum is equal to the checksum of the following (succeeding) frame. In such an embodiment, frame F7 is not similar because its checksum CS2 is not equal to the checksum CS3 of the following frame F8. In yet other embodiments, a frame may be determined (block 70) to be similar if it checksum is equal to both the checksum of the preceding frame and the checksum of the following frame. Thus, TCON 66 may make multiple frame comparisons to determine if a frame is similar. For example, TCON 66 may compare the checksum of a frame to the checksums of the three preceding frames and the two following frames. In general, TCON 66 may make 1, 2, 3, 4, 5, or more frame comparisons to determine whether a frame is similar.

As illustrated, the series of incoming frames 76 contains a smaller series of consecutive similar frames 80. Each frame of the consecutive similar frames 80 has a checksum equal to CS2. The series of consecutive similar frames 80 contains five similar frames beginning with frame F3 and ending with frame F7. Although frame F2 also has a checksum equal to CS2, frame F2 is not considered similar because the preceding frame F1 has a checksum equal to CS1, which is different from CS2. As explained previously, the definition of a similar frame may vary in other embodiments.

After TCON 66 has determined (block 70) that frame F3 is similar relative to frame F2, TCON 66 may switch (block 74) to decreased refresh mode for the next frame F4. Similarly, TCON 66 may determine (block 70) that frame F4 is similar relative to frame F3 and continue to operate in decreased refresh mode for the next frame F5. TCON 66, and subsequently display 12, may continue to operate in decreased refresh mode for frames F6, F7, F8. TCON 66 may then determine (block 70) that frame F8 is not similar and operate (block 72) in default mode for the next frame F9.

As may be appreciated, certain sequences of incoming frames 76 may cause TCON 66 to frequently alternate between operating (block 72) in default mode and switching (block 74) to decreased refresh mode. For example, TCON 66 may receive a series of alternating similar and non-similar frames 82. TCON 66 may determine (block 70) that frame F13 is similar, that frame F14 is not similar, that frame F15 is similar, and so on. As a result, TCON 66 may operate (block 72) in default mode for frame F13, switch (74) to decreased refresh mode for frame F14, operate (block 72) in default mode for frame F15, and so on. In other words, TCON 66 may alternate between default mode and decreased refresh mode between each frame.

Thus, certain embodiments may apply a threshold to prevent TCON 66 from changing modes until the threshold is met. For example, a first threshold may be applied to prevent TCON 66 from switching (block 74) to decreased refresh mode until a minimum number of consecutive frames with identical checksums are received by TCON 66. The first threshold may require 1, 2, 3, 4, 5, or more consecutive frames with identical checksums before TCON 66 may determine (block 70) that a frame is similar and switch (block 74) to decreased refresh mode. If the first threshold value is not met, TCON 66 may determine (block 70) that a frame is non-similar and continue to operate (block 72) in default mode. In another example, a second threshold may be applied to prevent TCON 66 from operating (block 72) in default mode until a sufficient number of consecutive frames with non-identical checksums are received by TCON 66. The second threshold may require 1, 2, 3, 4, 5, or more consecutive frames with non-identical checksums before TCON 66 may operate (block 72) in default mode. If the second threshold value is not met, TCON 66 may determine (block 70) that a frame is similar and continue to operate in decreased refresh mode. As may be appreciated, the first and second thresholds may be applied independently or in combination. Further, the definition of a similar frame may include elements describe previously, including: a threshold, a preceding frame comparison, a succeeding frame comparison, multiple frame comparisons, or a combination thereof.

As shown, TCON 66 detects (block 68) the frame status after the current frame is displayed on display 12. For example, TCON 66 may determine (block 70) that frame F3 is similar relative to frame F2 after frame F3 has already been displayed. Therefore, frame F3 may be displayed in default mode rather than in decreased refresh mode. In other embodiments, TCON 66 may detect (block 68) the frame status before the current frame is displayed. In such an embodiment, frame F3 may be displayed in the decreased refresh mode rather than in default mode. Thus, the order in which the current frame is displayed and the current frame is determined (block 70) to be similar or non-similar may be implementation specific.

As illustrated, there is a one-frame delay between the time when TCON 66 determines (block 70) whether a frame is similar and the time when TCON 66 changes modes (blocks 72, 74). For example, when TCON 66 determines (block 70) that frame F3 is similar, frame F3 has already been displayed in default mode. TCON 66 switches (block 74) to decreased refresh mode for the following frame F4. Similarly, when TCON 66 determines (block 70) that frame F8 is not similar, frame F8 has already been displayed in decreased refresh mode. TCON 66 then operates (block 72) in default mode for the following frame F9. The one-frame delay may result from TCON 66 performing the frame comparison after the current frame is already displayed. Generally, this one-frame delay may not be noticeable. As discussed previously, other embodiments may perform the frame comparison before the current frame is displayed. Such embodiments may not include the one-frame delay.

In the embodiment shown, TCON 66 determines (block 70) whether a single frame is similar after the current frame is displayed. For example, TCON 66 determines (block 70) that frame F3 is similar after frame F3 is displayed; then, TCON 66 determines (block 70) that frame F4 is similar after frame F4 is displayed; and then TCON 66 determines (block 70) that frame F5 is similar after frame F5 is displayed. In other embodiments, the TCON 66 may determine (block 70) whether multiple frames are similar after the current frame is displayed. For example, TCON 66 may determine (block 70) after frame F3 is displayed; then, while frame F3 is still displayed, TCON 66 may determine (block 70) that frame F4 is similar, determine (block 68) that frame F5 is similar, and continue until the series of similar frames 80 is identified. In general, TCON 66 may determine (block 70) whether 1, 2, 3, 4, 5, or more frames are similar after the current frame is displayed. In the aforementioned example, TCON 66 may determine (block 70) that frame F8 is not similar before frame F8 has been displayed. Thus, when the last similar frame F7 of the series of consecutive similar frames 80 has been displayed, TCON may operate (block 72) in default mode for frame F8. Such an embodiment may not include the one-frame delay as described previously.

Figure 6B:
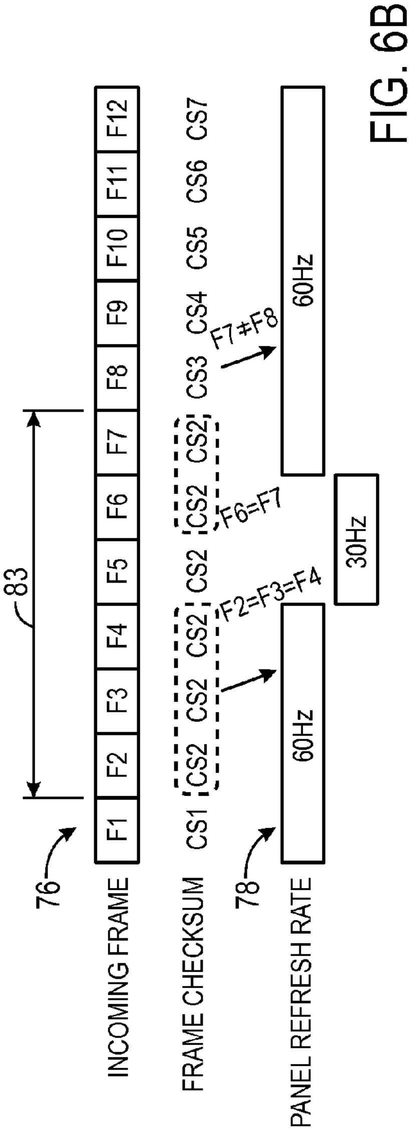

Additionally, FIG. 6B illustrates an embodiment in which the refresh rate 78 is reduced upon the TCON 66 determining (block 70) that the checksums of three preceding frames 76 and two following frames 76 are equal. As illustrated, consecutive frames 83 consist of the frames 76 from F2 through F7. In this embodiment, upon a determination (block 70) by the TCON 66 that the three preceding frames 76 and two following frames 76 are equal, the refresh rate 78 is reduced (block 74) from 60 Hz to 30 Hz. As such, the present illustration represents an embodiment where the TCON 66 is capable of determining whether the preceding (F2-F4) and the following (F7-F8) frames 76 have equal checksum values prior to the present frame F5 being displayed. Further, as illustrated, a return (block 72) to a higher refresh rate 78 may be delayed by a frame 76 when the refresh rate 78 is reduced upon a determination (block 70) by the TCON 66 that the two following frames 76 are no longer equal. Because the checksum value of frames F7 and F8 in the illustrated embodiment are not equal, TCON 66 will determine (block 70) at frame F6 that the decreased refresh rate 78 is no longer warranted. At this time, the refresh rate 78 may be increased (block 72) to the default refresh rate 78 at frame F7 prior to displaying the dissimilar frame F8. In this manner, the display 12 may operate at a reduced power from constantly operating in the default mode (block 72), while still maintaining a higher picture quality than the embodiment illustrated in FIG. 6A.

Figure 7:
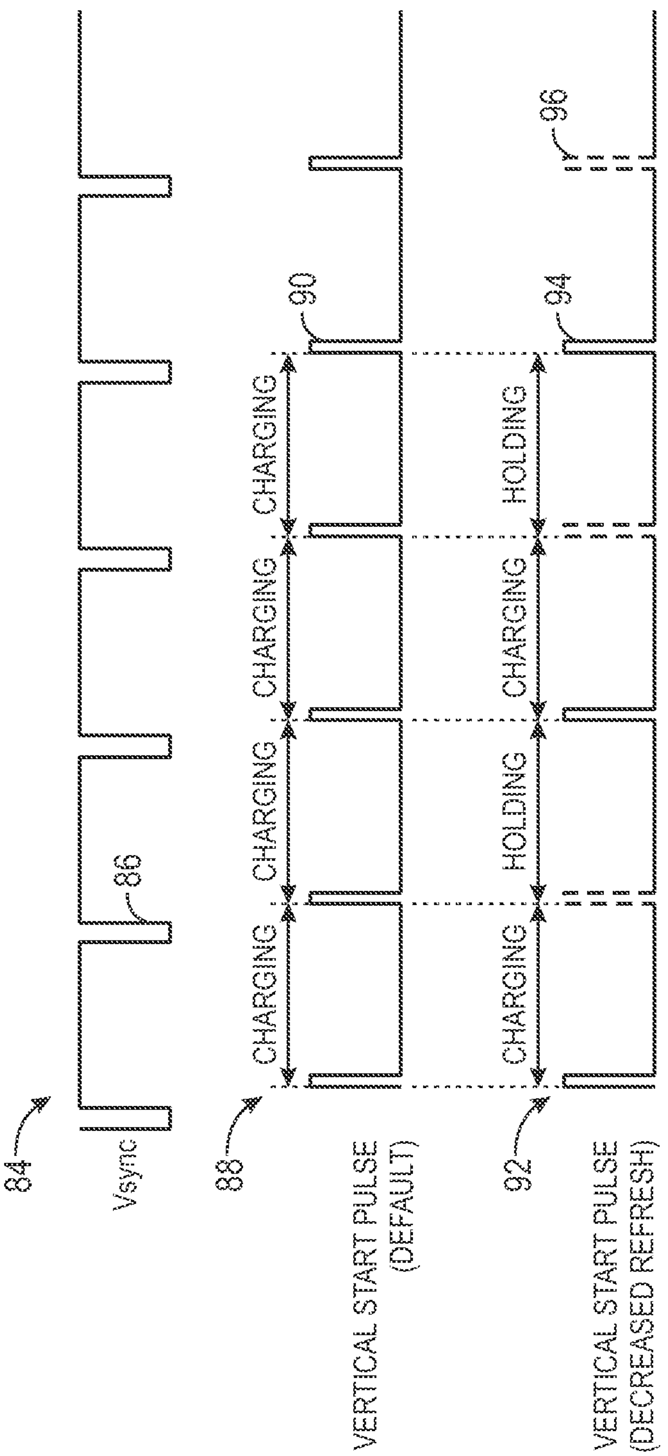
FIG. 7 is a timing diagram representing frame dropping in accordance with aspects of the present invention.

As described previously, TCON 66 may decrease the power consumption of device 10 by controlling the refresh rate of display 12. In particular, the refresh rate may be lowered to reduce the power consumption of device 10 once a frame has been determined (block 70) to be similar. To implement the lower refresh rate, display 12 may maintain the current frame instead of refreshing the current frame. Maintaining the current frame may also be called frame holding (as applied to the current frame) or frame dropping (as applied to the following frame). In other words, maintaining the current frame results in the following frame not being displayed. FIG. 7 illustrates a timing diagram representing frame dropping in one embodiment of display 12 configured to operate in decreased refresh mode.

In general, frame dropping occurs when a frame is not refreshed because another frame is maintained, as may result from operating display 12 in decreased refresh mode. Frame dropping may not occur when display 12 operates (block 72) in default mode. For example, the default refresh rate of display 12 may be 60 Hz. Frame dropping may not occur at the default refresh rate of 60 Hz. However, when display 12 is operating in decreased refresh mode, display 12 may drop every other frame. As a result, display 12 may refresh the frames with half of the frequency (30 Hz) in decreased refresh mode as compared to the default mode. In other embodiments, display 12 may drop every third frame or display 12 may drop two out of every three frames, in which case the refresh rate in decreased refresh mode may be 40 Hz and 20 Hz respectively. The timing of the may be controlled by a vertical synchronization signal and a vertical start signal as illustrated by FIG. 7.

The vertical synchronization signal (Vsync) is a pulse wave that has a waveform 84 that includes downwards pulses 86 at intervals corresponding to the default refresh rate (e.g. 60 Hz). Similarly, the vertical start is another pulse wave that has a waveform 88 that includes upwards pulses 90 (vertical start pulses) at intervals corresponding to the default refresh rate. As illustrated, the vertical start pulses 90 occur at substantially the same frequency as the pulses 86 of Vsync. Further, the start of start pulse 90 approximately corresponds to the end of Vsync pulses 86. Each vertical start pulse 90 starts the process 67 to refresh display 12. Display 12 may not be refreshed unless a start pulse 90 is asserted. Further, if display 12 is not refreshed, the refresh rate of display 12 may decrease. Thus, certain embodiments of display 12 may include circuitry to drop start pulses 90 to decrease the refresh rate of display 12. In other words, when display 12 has switched (block 74) to decreased refresh mode, start pulses 90 may occur at a lower frequency, resulting in a decreased refresh rate.

When display 12 is operating (block 72) in default mode, the vertical start signal may have waveform 88. Start pulses 90 approximately correspond to pulses 86 of the Vsync signal. Further, both pulses 86, 90 may occur at a frequency that is substantially equal to the default refresh rate (e.g. 60 Hz). As discussed previously, display 12 is refreshed for each start pulse 90 of the vertical start signal. Thus, display 12 is refreshed at the same frequency as the vertical start signal, which is substantially equal to the frequency of the Vsync signal (e.g. 60 Hz).

After each start pulse 90, process 67 is implemented by display side 44, and display 12 is in a frame charging mode. Frame charging mode includes a series of parameters, such as voltages and power consumption, which are used by the elements of device 10 to refresh display 12. For example, frame charging mode may include drawing a voltage of approximately 8 V from voltage regulator 62 and operating image receiver 50 in normal mode to refresh display 12. The various parameters of frame charging will be discussed further below in FIGS. 8, 9.

However, when display 12 has switched (block 74) to decreased refresh mode, the vertical start signal may have a different waveform 92. Waveform 92 includes start pulses 94 and dropped pulses 96. Waveform 92 has approximately half the number of start pulses 94 as compared to waveform 88. Thus, display 12 may be refreshed with approximately half the frequency in decreased refresh mode as compared to default mode. As illustrated, start pulses 94 correspond approximately to the odd-numbered start pulses 90 of waveform 88. In addition, dropped pulses 96 correspond approximately to the even-numbered start pulses 90 of waveform 88. In other embodiments, the number and arrangement of start pulses 94 and dropped pulses 96 may vary.

As described previously, after each start pulse 94, process 67 is implemented by display side 44 and display 12 is in frame charging mode. However, when display 12 has switched (block 74) to decreased refresh mode, display 12 may also operate in a frame holding mode. As shown, display 12 may operate in frame holding mode after each dropped pulse 96. Frame holding mode includes a series of parameters, such as voltages and power consumption, which are used by the elements of device 10 to maintain an image on display 12. In general, the parameters in frame holding mode may be less than the parameters in frame charging mode.

In the embodiment shown, display 12 alternates between frame charging mode and frame holding mode. Display 12 is refreshed for each start pulse 94, but display 12 is not refreshed for dropped pulses 96. Thus, when display 12 is in decreased refresh mode, display 12 may be refreshed with approximately half the frequency of the default mode (e.g. 30 Hz). According to other embodiments, dropped pulses 96 may correspond to a different pattern of start pulses 90 to achieve a different refresh rate in decreased refresh mode, such as 40 Hz or 20 Hz.

Figure 8:
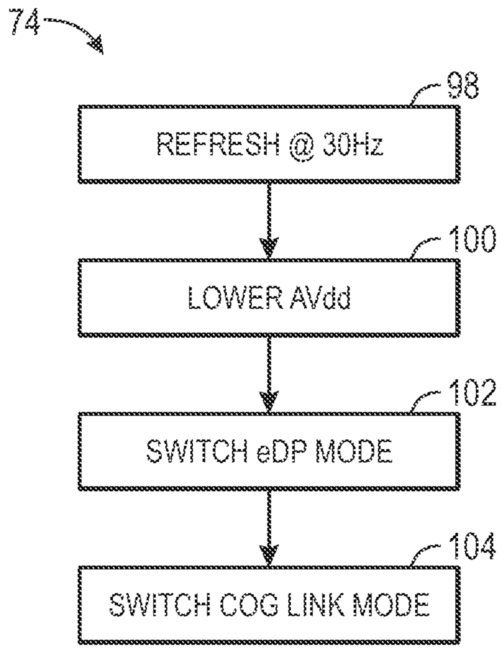
FIG. 8 is a flow chart of a process for operating in a decreased refresh mode in accordance with aspects of the present disclosure.

As discussed previously, the frame charging and frame holding modes of display 12 may include parameters, such as voltages and power consumption, to refresh or maintain images on display 12. Further, the parameters of the frame holding mode may be less than the parameters of frame charging mode. Thus, when display 12 switches (block 74) to decreased refresh mode, the aforementioned parameters may be decreased or otherwise changed. FIG. 8 is a flow chart of a process for changing certain parameters of elements of device 10 when display 12 switches (block 74) to decreased refresh mode.

In one embodiment, switching (block 74) to decreased refresh mode may include refreshing (block 98) display 12 at a refresh rate of 30 Hz. As discussed previously, the refresh rate in decreased refresh mode may be any number less than the default refresh rate, such that no visible disruptions appear on display 12. Switching (block 74) to decreased refresh mode may also include lowering (block 100) an analog voltage (AVdd) drawn from voltage regulator 62. For example, the AVdd may be approximately 8 V in default mode, and AVdd may be lowered to approximately 4 V in decreased refresh mode. In other embodiments, the AVdd in decreased refresh mode may be approximately 1 percent to approximately 99 percent, approximately 10 percent to approximately 90 percent, or approximately 25 to approximately 75 percent of the AVdd in default mode. Generally, a lower AVdd will reduce the power consumption of device 10. However, AVdd may affect downstream voltages on display side 44. Certain downstream voltages may need to be maintained above a certain level to prevent visible disruptions on display 12. For example, Vcom is a downstream voltage that may be used for holding pixels in an active state and directly affects image brightness. If Vcom decreases below a certain level, the image brightness may be negatively impact. Thus, in certain embodiments, the decreased AVdd may be high enough to maintain Vcom unchanged. In such an embodiment, when display 12 has switched (block 74) to decreased refresh mode, the image brightness of display 12 is unaffected.

Switching (block 74) to decreased refresh mode may also include switching (block 102) image receiver 50 from normal mode to down. According to certain embodiments, when image receiver 50 is in normal mode, image receiver 50 receives image data from image source 48. When image receiver 50 is down, image receiver may not receive image data from image source 48. Thus, when display 12 operates (block 72) in default mode, image receiver 50 may operate entirely in normal mode. However, when display 12 switches (block 74) to decreased refresh mode, a portion of incoming frames 76 is maintained instead of refreshed. When the portion of incoming frames 76 is maintained, the existing image data is used, so image receiver 50 may not need to receive image data from image source 48. Thus, image receiver 50 may be switched (block 102) to down. When display 12 needs to be refreshed, image receiver may be returned to normal mode. As may be appreciated, switching (block 102) image receiver 50 to down may reduce the power consumption of device 10.

In addition, switching (block 74) to decreased refresh mode may include switching (block 104) the mode of a chip-on-glass (COG) link. In certain embodiments, the COG may perform algorithms or routines on the image data and transmit the image data to row drivers 58 and column drivers 60 through the COG link. As discussed previously, when display 12 switches (block 74) to decreased refresh mode, a portion of incoming frames 76 is maintained instead of refreshed. When the portion of incoming frames 76 is maintained, the existing image data is used, so the COG link may not need to transmit image data. Thus, the COG link mode may be switched (block 104) from normal mode to a lower power mode when display 12 is in decreased refresh mode. As may be appreciated, certain elements of device 10 may not need to be fully functional when display 12 is in decreased refresh mode. Thus, in other embodiments, other parameters of device 10 may be adjusted in decreased refresh mode to decrease the power consumption of device 10.

Figure 9:
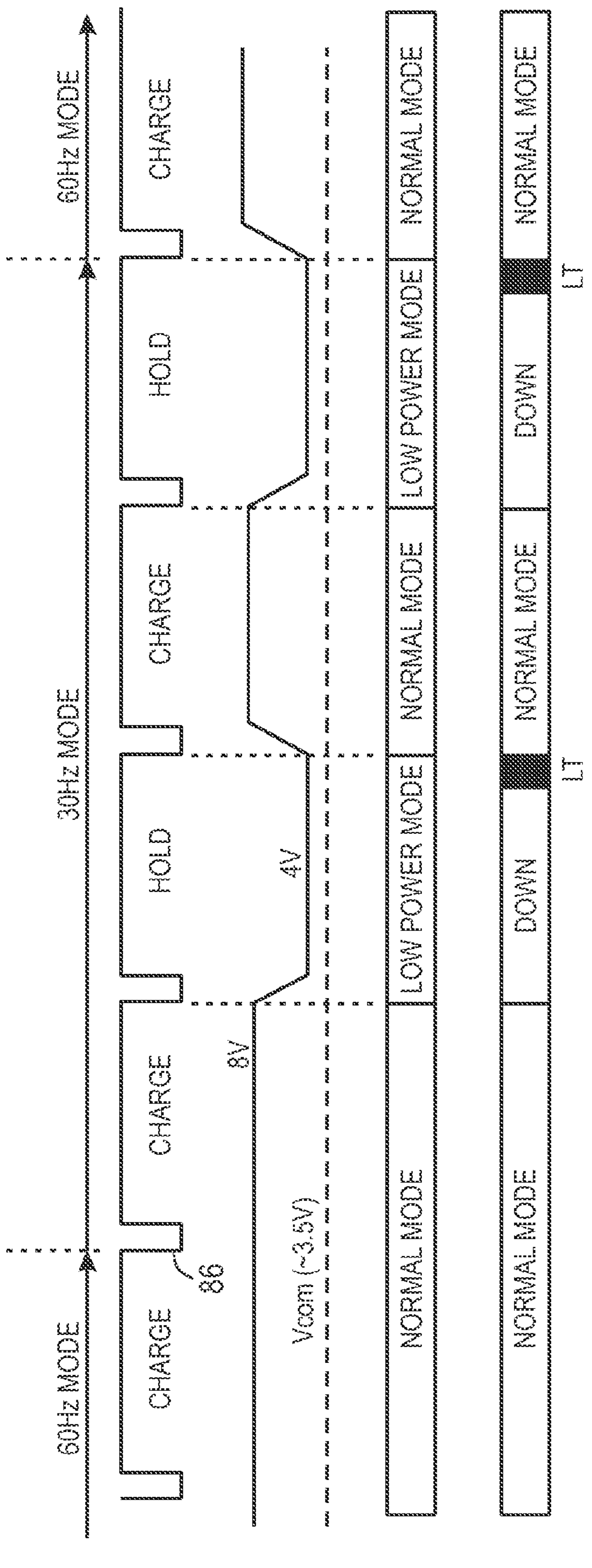
FIG. 9 is a timing diagram of the power supply modulation of a display device when operating in a default refresh mode and a decreased refresh rate in accordance with aspects of the present disclosure.

FIG. 9 is a timing diagram that illustrates the timing of the parameter changes as described in FIG. 8. Specifically, FIG. 9 illustrates the levels and modes of Vsync, AVdd, the COG link, and image receiver 50 (e.g., eDP receiver) when display is in default mode and in decreased refresh mode. As illustrated, when display 12 is operating (block 72) in default mode (e.g., at 60 Hz), display 12 is in frame charging mode. When display 12 has switched (block 74) to decreased refresh mode (e.g., at 30 Hz), display 12 may alternate between frame charging mode and frame holding mode between pulses 86 of Vsync.

As shown, AVdd is approximately 8 V when display 12 is in frame charging mode. AVdd is lowered (block 100) to approximately 4 V when display 12 is in frame holding mode. As illustrated, 8 V is approximately the voltage required to refresh the pixels of display 12, and 4 V is approximately the voltage required to hold or maintain the pixels of display 12. In other embodiments, the required voltages may vary. For example, the voltage required to refresh the pixels of display 12 may be approximately 1 V to approximately 100 V, approximately 5 V to approximately 95 V, or approximately 10 V to approximately 50 V. In addition, the voltage required to maintain the pixels of display 12 may be approximately 10 percent to approximately 90 percent of the voltage required to refresh the pixels.

In the embodiment shown, AVdd transitions from approximately 8 V to approximately 4 V quickly enough to maintain a stable voltage during frame charging and a stable voltage during frame holding. In other words, AVdd is approximately 8 V for substantially the entire time display 12 is in frame charging mode. In addition, AVdd is approximately 4 V for substantially the entire frame holding mode. As discussed previously, AVdd is high enough in both modes to maintain Vcom at approximately 3.5V, so image brightness is not affected between frame charging and frame holding.

As discussed above, the COG link operates in normal mode during frame charging and is switched (block 104) to lower power mode during frame holding. As illustrated, the COG link may quickly switch from normal mode to lower power mode and vice versa with minimal delay. Similarly, image receiver 50 is also in normal mode during frame charging and is switched (block 102) to down during frame holding. Image receiver 50 can quickly switch (block 102) from normal mode to down. However, in some embodiments, image receiver may not be able to quickly return to normal mode from down. As illustrated, link training may be initiated before image receiver 50 returns to normal mode from down. Further, link training has an associated delay and may be initiated prior to the onset of frame charging. As may be appreciated, link training may be initiated at a varying time intervals during frame holding. In other embodiments of device 10, certain elements of device 10 may not need to be fully functional when display 12 is in frame holding mode. Thus, in other embodiments, other parameters of device 10 may be adjusted in decreased refresh mode to decrease the power consumption of device 10.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A display device, comprising:

a timing controller configured to control a rate at which frames are refreshed on a display, wherein the rate is one of a first rate or a second rate, wherein the first rate is higher than the second rate, and wherein the timing controller comprises:

an image receiver configured to receive image data; and a pixel formatter configured to receive image data from the image receiver and format the image data in a first mode or in a second mode, wherein the first mode comprises refreshing frames at the first rate and the second mode comprises refreshing frames at the second rate, wherein the second rate comprises a repeating cycle comprising a charging mode followed by a holding mode, wherein the charging mode operates at a first voltage and the holding mode operates at a second voltage.

2. The display device of claim 1, wherein the timing controller is configured to control the rate at which frames are refreshed at the first rate if the image data is not static and at the second rate if the image data is static.

3. The display device of claim 2, wherein the timing controller is configured to determine whether the image data is static or not static using a checksum comparison.

4. The display device of claim 2, wherein the timing controller is configured to determine whether the image data is static or not static using a hash function or any other image data analysis suitable for determining whether one frame in the image data is different from a previous frame.

5. The display device of claim 1, wherein the timing controller is configured to control a rate at which frames are refreshed at the first rate, the second rate, or a third rate, wherein the first, second and third rates are different.

6. The display device of claim 1, wherein the timing controller comprises a processor configured to determine whether the image data is static or not static, wherein the processor is configured to control the rate at which frames are refreshed at the first rate if the image data is not static and at the second rate if the image data is static, and wherein the image data is determined to be static when at least three frames immediately prior to and two frames immediately following the currently displayed frame are substantially similar.

7. The display device of claim 1, wherein the timing controller comprises a processor configured to perform a checksum comparison, a hash function, or any other image data analysis suitable for determining whether the currently displayed frame in the image data is different from at least the frame immediately prior to and the frame immediately following the currently displayed frame.

8. The display device of claim 1, wherein the timing controller comprises:

a display interface configured to receive formatted image data from the pixel formatter; and drivers configured to receive the formatted image data from the display interface.

9. The display device of claim 8, comprising a voltage regulator configured to supply power to the display interface at a first level when the pixel formatter is formatting the image data in the first mode and supply power to the display interface at a second level when the pixel formatter is formatting the image data in the second mode, wherein the first level is higher than the second level.

10. The display device of claim 1, wherein the timing controller is configured to refresh a first portion of the display at the first rate and refresh a second portion of the display at the second rate.

11. The display device of claim 1, wherein the first voltage is greater than the second voltage.

12. A method of displaying image data on a display, the method comprising:

determining whether a current frame is similar relative to a second frame;

displaying the current frame and refreshing frames succeeding the current frame at a first rate if the current frame is not similar; and displaying the current frame and refreshing frames succeeding the current frame at a second rate if the current frame is similar, wherein the first rate is higher than the second rate, and wherein the second rate comprises a repeating cycle comprising a charging mode and a holding mode, wherein the charging mode operates at a first voltage and the holding mode operates at a second voltage, and wherein the first voltage is greater than the second voltage.

13. The method of claim 12, wherein determining whether the current frame is similar comprises comparing the current frame to a preceding frame.

14. The method of claim 12, wherein determining whether the current frame is similar comprises comparing the current frame to a succeeding frame.

15. The method of claim 12, wherein determining whether the current frame is similar comprises comparing the current frame to at least one preceding frame and at least one succeeding frame.

16. The method of claim 12, wherein determining whether the current frame is similar comprises determining whether the current frame is similar to at least two other consecutive frames.

17. The method of claim 12, wherein determining whether the current frame is similar comprises determining whether any portion of the current frame is similar relative to a corresponding portion of the second frame; and displaying a similar portion of the current frame at the second rate when the portion of the current frame is similar.

18. The method of claim 12, wherein determining whether a current frame is similar relative to a second frame comprises performing a checksum comparison, a hash function, an image data analysis, or combinations thereof.

19. The method of claim 12, wherein displaying the current frame and refreshing frames succeeding the current frame at the first rate comprises refreshing frames succeeding the current rate at approximately 60 Hz.

20. The method of claim 12, wherein displaying the current frame and refreshing frames succeeding the current frame at the second rate comprises refreshing frames succeeding the current rate at approximately 30 Hz.

21. A system, comprising:

pixel drivers configured to drive pixels to display consecutive frames representing image data;

a timing controller configured to control a rate at which frames are refreshed on a display, wherein the rate is one of a first rate or a second rate, and the first rate is higher than the second rate; and a power supply configured to supply power to the system according to whether the timing controller is controlling the rate at the first rate or the second rate, wherein the power supply supplies power based on a first set of parameters at the first rate and a second set of parameters at the second rate, and wherein the second set of parameters comprises a repeating cycle of a charging mode consuming a first voltage and a holding mode consuming a second voltage, wherein the first voltage is higher than the second voltage.

22. The system of claim 21, comprising an image transmitter configured to deliver image data to the timing controller.

23. The system of claim 21, wherein the first set of parameters draws more energy than the second set of parameters, and wherein the first and the second sets of parameters include an analog voltage drawn by the pixel drivers and a Vcom voltage drawn to hold the pixels in a steady state.

24. The system of claim 21, comprising an EEPROM configured to store image data accessible by the timing controller.

25. The system of claim 21, comprising backlight control circuitry configured to control a backlight of the display.

26. The system of claim 21, comprising a processor configured to determine whether the image data is static or not static, wherein the processor is configured to control the rate at which frames are refreshed at the first rate if the image data is not static and at the second rate if the image data is static.

27. The system of claim 21, comprising:

an image transmitter configured to deliver image data to the timing controller;

a memory configured to store image data accessible by the timing controller; and a processor configured to determine whether the image data is static or not static, wherein the processor is configured to control the rate at which frames are refreshed at the first rate if the image data is not static and at the second rate if the image data is static.

28. A method of displaying image data on a display, comprising:

refreshing frames on the display in a first mode or a second mode, wherein the first mode comprises refreshing frames at a first rate, and the second mode comprises refreshing frames at a second rate, wherein the first rate is higher than the second rate, and the second rate comprises a repeating cycle of charging and then maintaining the frames; and receiving power from a voltage regulator during the second mode at a first level when charging frames and receiving power from the voltage regulator during the second mode at a second level when maintaining frames, wherein the first level is higher than the second level.

29. The method of claim 28, wherein refreshing frames on the display in the first mode or the second mode comprises refreshing a first portion of the display at the first rate and refreshing a second portion of the display at the second rate.

30. The method of claim 28, comprising receiving images at an image receiver when refreshing frames in the first mode and not receiving images at the image receiver when refreshing frames in the second mode.

31. The method of claim 28, wherein the voltage regulator provides more power during the first mode than during the second mode.

* * * * *